United States Patent [19]

Krude et al.

[11] 4,240,680
[45] Dec. 23, 1980

[54] BEARING ASSEMBLY FOR A MOTOR VEHICLE WHEEL

[75] Inventors: Werner Krude, Siegburg-Kaldauen; Karl-Heinz Müller, Wissen; Alfons Jordan, Hennef, all of Fed. Rep. of Germany

[73] Assignee: Uni-Cardan AG, Siegburg, Fed. Rep. of Germany

[21] Appl. No.: 29,077

[22] Filed: Apr. 11, 1979

[30] Foreign Application Priority Data

Apr. 21, 1978 [DE] Fed. Rep. of Germany ....... 2817546

[51] Int. Cl.³ .................... F16C 33/76; F16D 3/30
[52] U.S. Cl. .................................. 308/187.1; 64/21; 180/259
[58] Field of Search .................. 308/16, 36.1, 36.5, 308/187, 187.1, 187.2, 194; 180/254, 258, 259; 64/21, 22

[56] References Cited

U.S. PATENT DOCUMENTS

| | | | |
|---|---|---|---|
| 3,520,152 | 7/1970 | Schmid | 64/21 |
| 3,668,893 | 6/1972 | Schmid | 64/21 |
| 4,094,376 | 6/1978 | Welschof | 180/254 |
| 4,129,345 | 12/1978 | Krude | 308/187.1 |

FOREIGN PATENT DOCUMENTS

| | | | |
|---|---|---|---|
| 2233478 | 2/1973 | Fed. Rep. of Germany | 64/21 |
| 2804339 | 8/1978 | Fed. Rep. of Germany | 64/21 |
| 1331697 | 5/1963 | France | 180/259 |

Primary Examiner—Richard R. Stearns
Attorney, Agent, or Firm—Toren, McGeady and Stanger

[57] ABSTRACT

A bearing assembly for use with a motor vehicle wheel includes an inner sealing ring located within an outer sealing ring, and a constant velocity universal joint located within the inner bearing ring for driving a wheel hub. A contact seal is positioned between the spherical outside surface of the outer joint member of the universal joint and the inside surface of the inner bearing ring. The contact seal extends in the axial direction of the universal joint and has one end fitted into a groove in the inside surface of the inner bearing ring. A plurality of sealing lips extend inwardly from the inner surface of the contact seal into contact with the spherical outside surface of the outer joint member. The lips are spaced apart in the axial direction of the universal joint and extend perpendicularly to the spherical outer surface of the outer joint member. A reinforcing ring laterally encloses the outer surface of the contact seal.

8 Claims, 2 Drawing Figures

BEARING ASSEMBLY FOR A MOTOR VEHICLE WHEEL

SUMMARY OF THE INVENTION

The present invention is directed to a bearing assembly for a motor vehicle wheel and, more particularly, it is directed to a bearing assembly for the wheel hub which is driven by a constant velocity universal joint and is arranged on the wheel support of the motor vehicle wheel. The bearing assembly includes an outer bearing ring fastened to the wheel support and an inner bearing ring attached to the wheel hub. The inner bearing ring has an opening or bore in which the outer joint member of the constant velocity universal joint is positioned.

In German Pat. No. 25 56 244, a bearing assembly for a motor vehicle wheel is disclosed in which the diameter of the opening in the inner bearing ring is larger than the outside diameter of the outer joint member. Further, the wheel hub is releasably mounted on the inner bearing ring and is centered within the ring. The wheel hub has a trunnion which extends through the opening in the inner bearing ring and supports the inner joint member. Alternatively, the joint member is supported by a trunnion which has a flange on its end face directed toward the wheel hub with a drive connection connecting the flange to the wheel hub. The drive connection is force-locked in the circumferential direction and is axially mounted. The outside surface of the outer joint member is spherically shaped and a contact seal is located between the inner bearing ring and the spherical surface on the outer joint member.

It is the primary object of the present invention to provide a simple mechanical seal for the bearing assembly with the seal located between the outer joint member of the constant velocity universal joint and the inner bearing ring so that no additional constructional steps are required.

In accordance with the present invention, the surface of the contact seal facing toward the outside surface of the outer joint member has at least two sealing lips which contact the outer joint member and are arranged in spaced relation. Further, the contact seal is fixed in the bore or opening through the inner bearing ring.

Due to the arrangement of the plurality of the sealing lips in contact with the outside surface of the outer joint member, an exact seal is ensured at all times and at any chosen bending angle. As a result, the principle of a labyrinth seal is achieved.

Furthermore, it is advantageous that the seal is secured in the opening through the inner bearing ring so that it cannot be harmed by outside influences. As a result, such a seal is protected against impinging rocks or shrubbery and, for this reason, has a much longer service life as compared to seals which are exposed to outside influences under harsh driving conditions.

Another characteristic of the present invention is the perpendicular arrangement of the sealing lips relative to the outside surface of the outer joint member with the lips extending over the entire circumference of the contact seal. With the sealing lips disposed perpendicularly to the outer surface of the outer joint member they perform a double function. The sealing lips closer to the outside of the joint serve as a dirt and dust protector, while those located closer to the hollow space within the joint prevent the lubricant from escaping out of the joint.

To provide a simple geometric shape for the contact seal and one that can be easily arranged within the bore of the inner bearing ring, an important feature of the present invention is the provision of a cylindrical outer surface for the contact seal with the diameter of the outer surface being equal to or less than the diameter of the opening through the inner bearing ring. This shape is especially advantageous since it ensures that the cylindrical outer surface affords an exact sealing action between the contact seal and the inner bearing ring without any production difficulties. The large contact surface, as viewed in the axial direction, is extremely important in providing the sealing action with the inner bearing ring.

Another feature of the present invention is the provision of an annular projection on one end of the contact seal which fits into a corresponding groove within the inner bearing ring and affords the axial fixation of the seal.

With the contact seal fixed in the groove in the inner bearing ring, clips or other securing means become superfluous, since the annular projection is formed as an integral part of the seal and ensures, without any problems, an adequate attachment to the inner bearing ring when an appropriate initial tension is provided.

Where the contact seal extends partially outside of the inner bearing ring, in accordance with another feature of the present invention, its outer surface is laterally enclosed by an axially extending reinforcing ring. The reinforcing ring provides a support for the seal and, at the same time, protects it against any outside influences. Further, it is easy to provide the reinforcing ring with an outwardly flanged edge with the flanged edge fitting into the groove in the inner bearing ring into engagement with the contact seal.

In another embodiment of the present invention, a sealing boot is attached to one end of the contact seal so that it provides a covering over and is attached to the drive shaft joined to the outer joint member.

In such an embodiment, there is the advantage that the sealing boot covers the outer surface of the outer joint member so that it does not need a special surface treatment to protect against corrosion or the like. Accordingly, the sealing boot connected to the contact seal protects the outer surface of the outer joint member against corrosion and other outside influences which might occur during motor vehicle use.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
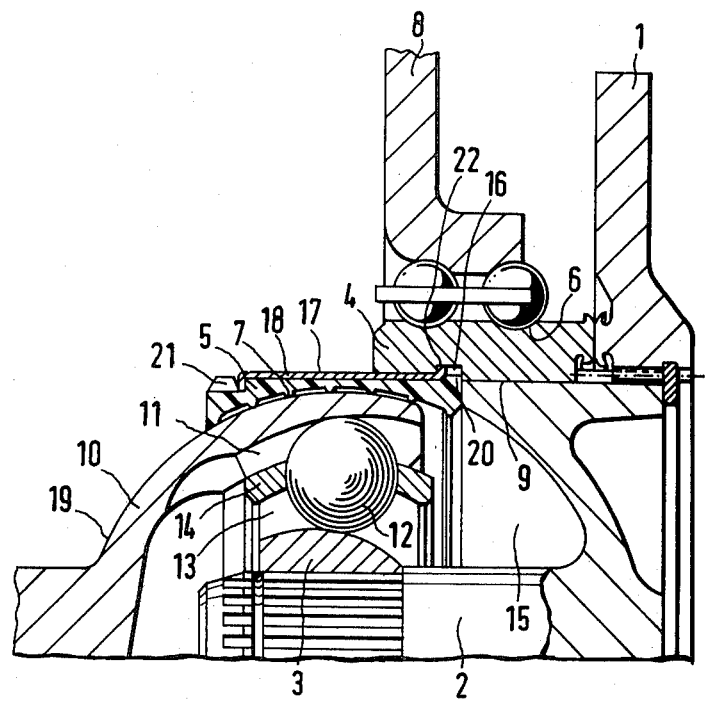
FIG. 1 is a partial sectional view of a wheel bearing assembly with supporting bearings and a constant velocity universal joint and including a contact seal embodying the present invention.

In FIG. 1 a bearing assembly for a motor vehicle wheel is illustrated including a constant velocity universal joint. A wheel hub or flange 1 is fastened at its ends to the wheel or the brake disc, not shown. A trunnion 2 is secured to the wheel hub and extends into and forms a support for the inner joint member 3 of the universal joint. The wheel hub 1 is welded to an inner bearing ring 4. The inner bearing ring has circumferentially extending grooves 6 on its outer surface and rolling bodies are placed in these grooves and extend into similar grooves in the inner surface of an outer bearing ring 8. The wheel bearing assembly is fastened to a wheel support, not shown, through the outer bearing ring 8.

The inner bearing ring 4 forms a bore or opening 9 into which the outer joint member 10 of the universal joint extends. Outer joint member 10 is hollow and contains grooves 11 in its inside surface into which torque-transmitting balls 12 are arranged. Each ball 12 is held in a pair of cooperating grooves 11, 13, the groove 11 is located in the outer joint member 10 while groove 13 is formed in the inner joint member 3. The balls are guided between the inner and outer joint members in a window aperture of a cage 14. Inner space 15 within the joint is sealed by a contact seal 5.

Contact seal 5 is fixed at one end within a groove 16 formed in the inner surface of the inner bearing ring 4. The contact seal 5 has a cylindrically shaped outer surface 17 which contacts the inside surface of the inner bearing ring and extends outwardly from the bearing ring within a reinforcing ring 18 which provides an additional structural component. Sealing lips 7 extends inwardly from the inner surface of the contact seal 5 and are spaced apart in the axial direction of the universal joint. The sealing lips 7 contact the spherically shaped outer surface of the outer joint member 10. With the sealing lips 7 arranged perpendicularly relative to the outer surface 19 of the outer joint member 10, the sealing lips act in both axial directions of the joint. Accordingly, the sealing lips prevent dirt and dust from entering the joint from the outside and also prevent lubricant in the inner space 15 from leaking outwardly past the lips to the outside of the joint. To fix the position of the contact seal 5 at its end within the inner bearing ring 4, it has an annular projection 20 which is seated within the groove 16. This projection can be introduced into the groove with initial stress so that the contact seal is fastened in the axial direction and the initial stress is sufficient for its engagement on the outside surface 19 of the outer joint member 10.

With the reinforcing ring 18 laterally enclosing the contact seal, another projection 21 is provided at its opposite end so that the seal is fastened at the end of the reinforcing ring. Accordingly, both of the axially spaced ends of the contact seal are held against displacement. In this embodiment, the end of the reinforcing ring 18 within the inner bearing ring 4 has a radially outwardly flanged edge 22 which fits into the groove 16 along with the projection 20 on the seal.

Figure 2:
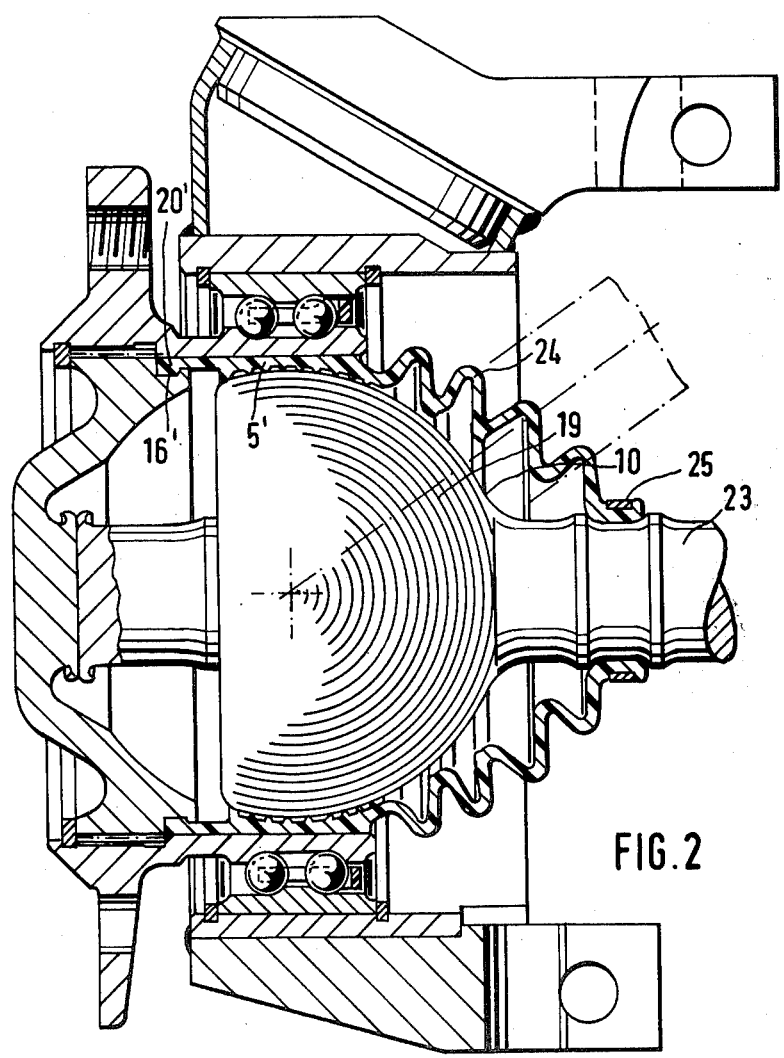
FIG. 2 is a sectional view of another embodiment of the present invention, similar to that shown in FIG. 1, however, the contact seal includes a sealing boot.

In FIG. 2, another wheel bearing assembly is illustrated which is similar in construction to the one shown in FIG. 1. There is the difference, however, that the end of the contact seal facing toward the drive shaft 23, connected to the outer joint member 10, is formed integrally with the contact seal 5'. The sealing boot 24 laterally encloses the outer joint member 10 of the universal joint and protects its outside surface 19 from the influences experienced under driving conditions. At its end spaced outwardly from the outer joint member 10, the sealing boot is fastened onto the drive shaft 23 by a clip 25 while its other end is formed integrally with or is directly connected to the contact seal 5' which is the same as the contact seal illustrated in FIG. 1. In this arrangement, the end of the contact seal within the inner bearing ring has an annular projection 20' which is fastened to the groove 16' in the ring.

While specific embodiments of the invention have been shown and described in detail to illustrate the application of the inventive principles, it will be understood that the invention may be embodied otherwise without departing from such principles.

What is claimed is:

1. A bearing assembly for use with a motor vehicle wheel including an axially elongated inner bearing ring arranged to be secured to the wheel hub of the motor vehicle wheel, an outer bearing ring laterally encircling and spaced radially outwardly from said inner bearing ring, said outer bearing ring is arranged to be attached to the wheel support of the motor vehicle wheel, a constant velocity universal joint comprising an outer joint member having a hollow space, an inner joint member located within the hollow space, said inner bearing ring forming an axially extending opening with the opening having a diameter larger than the outside diameter of said outer joint member, said outer joint member extends into the opening in said inner bearing ring, said inner bearing ring arranged to releasably receive the wheel hub centered therein, said inner joint member arranged to receive and support a trunnion attached to the wheel hub, said outer joint member having a spherically shaped outside surface, and a contact seal located between said inner bearing ring and the outside surface of said outer joint member, wherein the improvement comprises that said contact seal is elongated in the axial direction of said inner bearing ring and has an inwardly facing surface directed toward the outside surface of said outer joint member and an outwardly facing surface directed toward the inside surface of said inner bearing ring, said contact seal having at least two sealing lips extending inwardly from the inwardly facing surface thereof, said sealing lips spaced apart in the axial direction of said inner bearing ring and disposed in contact with the outside surface of said outer joint member, and said contact seal is fixed in the opening in said inner bearing ring.

2. A bearing assembly, as set forth in claim 1, wherein said sealing lips are disposed perpendicularly to the outside surface of said outer joint member.

3. A bearing assembly, as set forth in claim 1, wherein said contact seal has an axially extending cylindrically shaped outer surface having a diameter not greater than the diameter of the opening in said inner bearing ring.

4. A bearing assembly, as set forth in claim 1, wherein a groove is formed into and extends circumferentially around the surface of the opening in said inner bearing ring, and said contact seal has an outwardly extending projection which fits into said groove for securing said contact seal against axial displacement.

5. A bearing assembly, as set forth in claim 1, wherein an axially elongated reinforcing ring is concentric with and laterally encloses the outside surface of said contact seal with the inside surface of said reinforcing ring disposed in surface contact with the outside surface of said contact seal in the axial direction of said inner bearing ring.

6. A bearing assembly, as set forth in claim 5, wherein a groove is formed into and extends circumferentially around the surface of the opening in said inner bearing ring, and said reinforcing ring has an outwardly extending flange at one end thereof fitted into said groove in said inner bearing ring.

7. A bearing assembly, as set forth in claim 6, wherein said contact seal extends outwardly from said inner bearing ring with the opposite end of said contact seal located outwardly from said inner bearing ring having an outwardly extending projection positioned in contact engagement with the adjacent end of said reinforcing ring.

8. A bearing assembly, as set forth in claim 1, wherein said outer joint member has its axis alignable with the axis of said inner bearing ring and has a first end and a second end each extending transversely of its axis, said first end located within said inner bearing ring and said second end spaced outwardly from said inner bearing ring in the opposite direction from the wheel hub, a drive shaft connected to the second end of said outer joint member and extending axially outwardly therefrom in the direction away from the first end of said outer joint member, said contact seal having a first end and a second end spaced apart from one another in the axial direction of said inner bearing ring, said first end located within the opening in said inner bearing ring and said second end spaced from said first end in the direction toward the second end of said outer joint member, and a sealing boot attached to the second end of said contact seal and extending therefrom and laterally enclosing said drive shaft with the end of said sealing boot spaced from said contact seal fastened to said drive shaft.

* * * * *